US009160069B2

(12) United States Patent
Zhang

(10) Patent No.: US 9,160,069 B2
(45) Date of Patent: Oct. 13, 2015

(54) GROUNDED ANTENNA WITH CROSS-SHAPED HIGH-IMPEDANCE SURFACE METAL STRIPS AND WIRELESS COMMUNICATION DEVICE HAVING SAID ANTENNA

(75) Inventor: Lian Zhang, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 351 days.

(21) Appl. No.: 13/810,786

(22) PCT Filed: Nov. 4, 2011

(86) PCT No.: PCT/CN2011/081813
§ 371 (c)(1),
(2), (4) Date: Jan. 17, 2013

(87) PCT Pub. No.: WO2012/075867
PCT Pub. Date: Jun. 14, 2012

(65) Prior Publication Data

US 2013/0120211 A1 May 16, 2013

(30) Foreign Application Priority Data

Dec. 7, 2010 (CN) .......................... 2010 1 0576938

(51) Int. Cl.
*H01Q 1/52* (2006.01)
*H01Q 1/24* (2006.01)
*H01Q 15/00* (2006.01)

(52) U.S. Cl.
CPC ............... *H01Q 1/526* (2013.01); *H01Q 1/243* (2013.01); *H01Q 1/245* (2013.01); *H01Q 15/006* (2013.01); *Y02B 60/50* (2013.01)

(58) Field of Classification Search
CPC ............................. H01Q 15/006; H01Q 1/245
USPC .......................................................... 343/909
See application file for complete search history.

(56) References Cited

U.S. PATENT DOCUMENTS 6,426,722 B1 * 7/2002 Sievenpiper et al. .. 343/700 MS
7,081,865 B2 * 7/2006 Wu et al. ....................... 343/872

* cited by examiner

*Primary Examiner* — Hoang V Nguyen
*Assistant Examiner* — Michael Bouizza
(74) *Attorney, Agent, or Firm* — Shimokaji IP

(57) ABSTRACT

A grounded antenna may include cross-shaped high-impedance surface metal strips and a wireless communication device having said antenna. The antenna may include an antenna radiation unit and a ground plate and may be set inside of a housing. Multiple high-impedance surface units may be arranged on the ground plate in intervals.

20 Claims, 4 Drawing Sheets

GROUNDED ANTENNA WITH CROSS-SHAPED HIGH-IMPEDANCE SURFACE METAL STRIPS AND WIRELESS COMMUNICATION DEVICE HAVING SAID ANTENNA

TECHNICAL FIELD

The present invention relates to the field of antennas of wireless communication devices, in particular, the improvement relates to a grounded antenna with cross-shaped high-impedance surface metal strips and a wireless communication device having the antenna.

BACKGROUND

A user may be exposed to measurable radiofrequency electromagnetic radiation because of the radio waves emitted from the wireless communication device used for communicating. When conducting a conversation with a mobile communication terminal such as a mobile phone for instance, usually a user keeps his or her head within the electromagnetic radiation field emitted by the mobile phone. Therefore, governments of all countries including China have formulated comprehensive and safe standards and regulations to manage and restrain the exposure issues of radiofrequency energy; SAR (Specific Absorption Rate), which means electromagnetic wave adsorption rate and represents electromagnetic wave energy absorption rate of a mobile phone or other wireless communication devices, is an important evaluation parameter. It may be a test to indicate whether radiation impact from the mobile phone on the human body, especially the head, is in accordance with the standards. It is also a unit to show the amount of radiofrequency energy that may be absorbed by a human body using a mobile terminal, and may be used as a standard to protect the human body.

Currently, mobile terminals may be designed to be used under these extremely strict restrictions, so various devices and methods to lower SAR are under development. For example, design methods may include adding materials that can absorb an electromagnetic wave on a mobile terminal, optimizing radiofrequency induction current by the arrangement of metal parts, and complicated antenna design to lower SAR. However, these design methods may be often subject to the type of mobile terminals and may not be universally applicable.

SUMMARY OF THE INVENTION

An object of the present invention may be to provide a grounded antenna with cross-shaped high-impedance surface metal strips and a wireless communication device having the antenna. The present invention can lower the radiation emitted from an antenna to a human body without degrading communication quality, and also can be universally applicable.

A technical solution of the present invention may be: a grounded antenna with cross-shaped high-impedance surface metal strips, comprising an antenna radiating element and a ground plate thereof; such that multiple high-impedance surface units are arranged on the ground plate in intervals. Each high-impedance surface unit may be composed of two high-impedance surface metal strips to form a cross. A high-impedance surface through hole may be made at the intersection of the cross; and the high-impedance surface units connect with each other through the high-impedance surface through holes.

The grounded antenna may contain cross-shaped high-impedance surface metal strips. The ground plate may be a printed circuit board. The high-impedance surface units may be arranged on a surface of the printed circuit board. The high-impedance surface through holes may be set to pass through the printed circuit board.

The grounded antenna with cross-shaped high-impedance surface metal strips, such that the length of the metal strips composing cross-shaped high-impedance surface may be about 10 mm. As an example, the distance may range between two adjacent high-impedance surface metal strips, such as, for example, about 0.5 mm to 1.5 mm, and the length range of an overlapping section may be about 2.5 mm to 3.5 mm.

The grounded antenna may include cross-shaped high-impedance surface metal strips, such that the cross-shaped high-impedance surface units are arranged on the ground plate in lines.

The grounded antenna may include cross-shaped high-impedance surface metal strips, such that at least one high-impedance surface metal strip is inclined to the lines formed by the high-impedance surface units.

The grounded antenna may include cross-shaped high-impedance surface metal strips, such that the cross-shaped high-impedance surface units are arranged on the ground plate in rows.

The grounded antenna may include cross-shaped high-impedance surface metal strips, such that at least one high-impedance surface metal strip is inclined to the rows formed by the high-impedance surface units.

The grounded antenna may include cross-shaped high-impedance surface metal strips, such that among the high-impedance surface units, the corresponding high-impedance surface metal strips are substantially parallel.

The grounded antenna may include cross-shaped high-impedance surface metal strips, such that the antenna radiating element is a planar inverted-F antenna.

A wireless communication device may comprise a housing and an antenna used for communicating. The antenna may comprise an antenna radiating element and a ground plate that is set in the housing. Multiple high-impedance surface units may be arranged on the ground plate in intervals. Each high-impedance surface unit may be composed of two high-impedance surface metal strips to form a cross. A high-impedance surface through hole may be made at the intersection of the cross. The high-impedance surface units may connect with each other through the high-impedance surface through holes.

The grounded antenna with cross-shaped high-impedance surface metal strips and a wireless communication device having the antenna provided by the present invention, may include the use of multiple cross-shaped high-impedance surface units connected by high-impedance surface through holes and with each high-impedance surface unit composed of two high-impedance surface metal strips to form a cross. In one aspect of the invention surface waves may be repressed or deterred from transmitting along the surface. In another aspect of the invention, the incident plane waves may reflect substantially perpendicular to the surface at the same phase. The high-impedance surface may suppress surface waves, and can therefore, when placed around an antenna, reduce the radiation toward a person's head. The radiation emitted from a working wireless communication device toward a human body may be reduced, the radiation absorbed by a person's head may be reduced, and the specific absorption rate (SAR) may be lowered without reducing the plane waves energy, influencing the signal intensity, reducing radiation capability of the antenna or degrading communication quality. The present invention may be universally applicable.

DETAILED DESCRIPTION OF THE INVENTION

The present invention will be further described in detail below with reference to the accompanying drawings. It should be understood that the embodiments described herein are only used for describing the present invention with no intention to limit the specific implementation methods of the present invention in any way.

Figure 1:
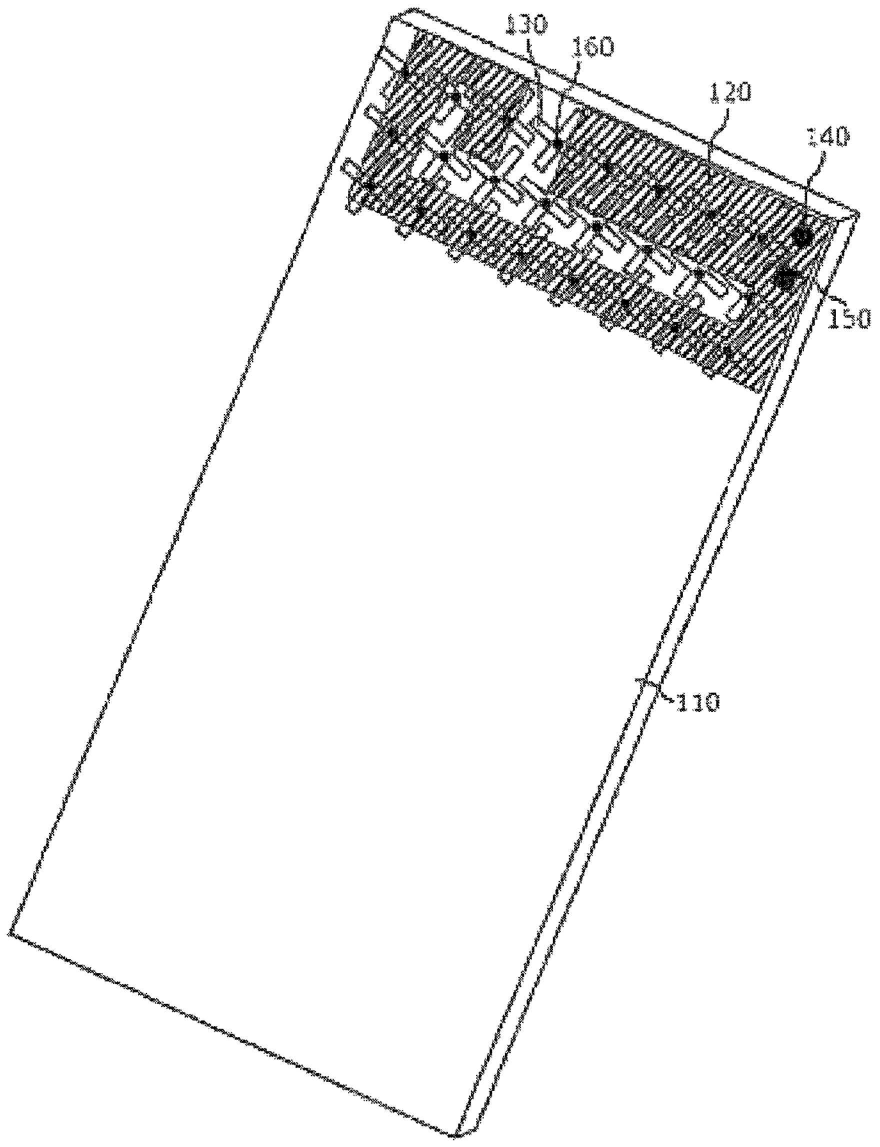
FIG. 1 is an exploded structural schematic diagram of a grounded antenna with cross-shaped high-impedance surface metal strips according to an embodiment of the present invention.

A grounded antenna with cross-shaped high-impedance surface metal strips of the present invention, one of the specific implementation methods thereof, is shown in FIG. 1. The grounded antenna may comprise an antenna radiating element 120 and a ground plate 110, such that multiple high-impedance surface units are arranged on ground plate 110 in intervals, and each high-impedance surface unit may be composed of two high-impedance surface metal strips 130 to form a cross. A high-impedance surface through hole 160 may be made at the cross's intersection of high-impedance surface metal strips 130. By the use of high-impedance surface through holes 160, the high-impedance surface metal strips 130 among the high-impedance surface units connect with each other.

Based on the above mentioned grounded antenna with cross-shaped high-impedance surface metal strips 130, the present invention may further provide a wireless communication device. One of the specific implementation methods thereof is that the wireless communication device comprises a housing and an antenna for communicating. The antenna is set in the housing, and may comprise an antenna radiating element 120 and a ground plate 110. Multiple high-impedance surface units may be arranged on the ground plate 110 in intervals. Each high-impedance surface unit may be composed of two high-impedance surface metal strips 130 to form a cross. A high-impedance surface through hole 160 may be made at the cross's intersection of high-impedance surface metal strips 130. By the use of high-impedance surface through holes 160, the high-impedance surface metal strips 130 among the high-impedance surface units may connect with each other.

The high-impedance surface of the present invention may refer to a surface structure configured on ground plate 110 of the antenna able to deter the electromagnetic waves from transmitting. The surface may have high-impedance characteristics for the surface waves of a certain frequency range. The surface may repress surface waves transmitting at the frequency in its stop band. It may not encourage the surface waves with a frequency range in its stop band to transmit. Secondly, the surface may reflect substantially perpendicular incident plane waves with a frequency range in its stop band at the same phase, such that no change has occurred to the phase of reflection waves or incident waves. The ground plate 110 herein refers to in particular the entire printed circuit board, while the high-impedance surface substitutes for the part of ground plate 110 under the antenna.

For the incident plane waves substantially perpendicular to the metal surface, the metal surface may make the phase of the plane waves change 180°. If the ground plate 110 of the antenna is a whole metal, then for the surface waves transmitting along its surface, whether or not the frequency range thereof is within the stop band, the impedance is zero. In comparison with antenna and wireless communication devices thereof of the prior art which use a whole metal plate for grounding, the antenna uses high-impedance surface units for grounding. The wireless communication device of the present invention, by the use of multiple cross-shaped high-impedance surface units connected by high-impedance surface through holes 160 and with each high-impedance surface unit composed of two high-impedance surface metal strips 130 to form a cross, may repress or deter the surface waves from transmitting along the surface. The present invention may enable the incident plane waves to reflect substantially perpendicular to the surface at the same phase. The high-impedance surface may suppress surface waves, and can therefore, when placed around an antenna, reduce the radiation toward a person's head. The radiation emitted from a working wireless communication device toward a human body may be reduced, the radiation absorbed by a person's head may be reduced, and the specific absorption rate (SAR) may be lowered without reducing the plane waves energy, without reducing the signal intensity, without reducing radiation capability of the antenna, and without degrading communication quality. The present invention may be universally applicable.

For example, an antenna radiating element 120 may be a planar inverted-F antenna, as shown in FIG. 1. There may be two terminal open-circuit branches on the antenna radiating element 120. The working principal thereof may be a quarter-wavelength resonance. The outside part, which may be wider and shorter, may be the high-frequency branch, while the inside part, which may be narrower and longer, may be the low-frequency branch. They connect with the radiofrequency transceiver circuit of the printed circuit board through a ground pin 140 of the antenna radiating element 120 and the feed pin 150 of the antenna radiating element 120.

Figure 2:
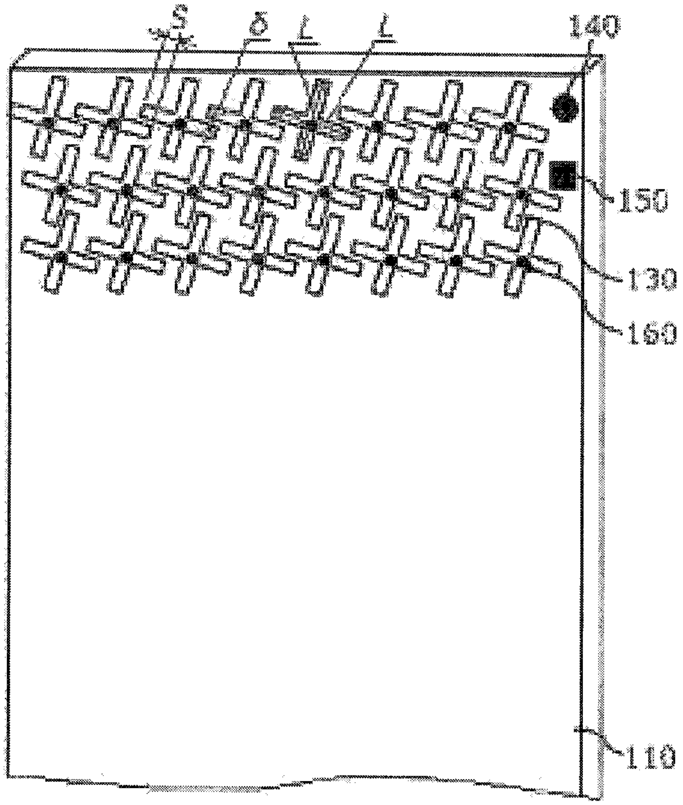
FIG. 2 is a schematic diagram of cross-shaped high-impedance surface units arranged on a ground plate according to an embodiment of the present invention.

In an embodiment, an implementation method of a grounded antenna may include cross-shaped high-impedance surface metal strips 130 with the wireless communication device having the antenna of the present invention, as shown in FIG. 2. The ground plate 110 may be a printed circuit board. The high-impedance surface units may be arranged on the surface of the printed circuit board. The high-impedance surface through holes 160 may pass through the printed circuit board. By the use of a copper-clad layer on the printed circuit board, cross-shaped high-impedance surface metal strips 130 may be made, and by the use of the clearance holes on the printed circuit board, high-impedance surface through holes 160 may be made.

Figure 3:
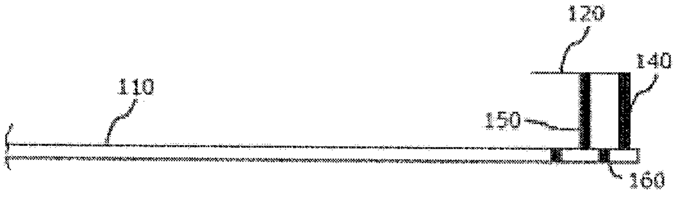
FIG. 3 is a side schematic diagram of a grounded antenna with cross-shaped high-impedance surface metal strips according to an embodiment of the present invention.

In an exemplary embodiment, as shown in FIG. 3, high-impedance surface through holes 160 are set to pass through the printed circuit board. Cross-shaped high-impedance surface metal strips 130 form an electrical connection with the metal layer on the bottom surface of the printed circuit board by a high-impedance surface through holes 160 at the intersections of high-impedance surface metal strips 130 to achieve the grounding of high-impedance surface units.

Specifically, cross-shaped high-impedance surface metal strips 130 may be arranged on the top surface of the printed circuit board and the bottom surface of the printed circuit board may be made of a whole metal layer. The cross-shaped high-impedance surface metal strips 130 may be tiled on the top surface of the metal circuit board as much as possible, especially the area that is covered by the antenna radiating element 120 to replace the original whole metal layer as a new ground plane of the antenna radiating element 120, which changes the zero Ohm ground plane to infinite impedance on the ground plane.

As shown in FIG. 2, the length L of metal strips 130 constituting the cross-shaped high-impedance surface may be about 10 mm. The distance range δ between two adjacent high-impedance surface metal strips 130 may be about 0.5 mm to 1.5 mm, and the length S of overlapping sections may be about 2.5 mm to 3.5 mm.

Further, the cross-shaped high-impedance surface units may be arranged on the ground plate 110 in lines such that at least one high-impedance surface metal strip 130 may be inclined to the lines formed by the high-impedance surface units. The cross-shaped high-impedance surface units may be arranged on the ground plate 110 in rows. At least one high-impedance surface metal strip 130 may be inclined to the rows formed by the high-impedance surface units. As an example, among the high-impedance surface units, the corresponding high-impedance surface metal strips may be substantially parallel. The high-impedance surface metal strips 130 of the high-impedance surface units can also be substantially parallel to or substantially perpendicular to the lines or rows formed by high-impedance surface units.

As the permittivity and the thickness of the printed circuit board have impacts on the structure dimensions of the cross-shaped metal strips, so the operating frequency band of the high-impedance surface units can be optimized during a design process by adjusting the length or width of the cross-shaped metal strips or the spaces between the cross-shaped metal strips to make it fall in the transmission channel range of the communication system.

Figure 5:
FIG. 5 is a schematic diagram showing an equivalent circuit of cross-shaped high-impedance surface units arranged on a ground plate according to an embodiment of the present invention.

The electromagnetic property of the cross-shaped high-impedance surface metal strips 130 employed in the antenna and the wireless communication device thereof of the present invention may include a lumped circuit element, electric capacity and electrical inductance. The equivalent circuit thereof may manifest as a resonating LC circuit that is substantially parallel. As shown in FIG. 5, it can be taken as a two-dimensional electric filter used to prevent the current from flowing along the surface.

Figure 4:
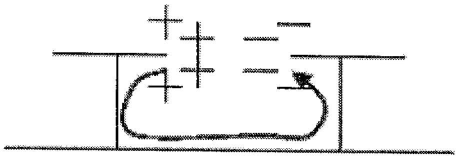
FIG. 4 is a schematic diagram showing the working principals of cross-shaped high-impedance surface units arranged on a ground plate according to an embodiment of the present invention.

As shown in FIG. 4, when the cross-shaped metal strips, together with the ground through holes, interact with electromagnetic waves, there may be an induced current that is substantially parallel to the voltage on the top surface generated on the cross-shaped metal strips. As a result there may be charges accumulated on the two ends of the cross-shaped metal strips and so can be equivalent to a capacitance effect. The charges may flow in the metal through holes and the bottom surface of the printed circuit board circularly to form a current loop. Connected with the current is the magnetic field and electrical inductance. The capacitance and electrical inductance schematic diagram is shown in FIG. 4, and an equivalent resonating circuit is shown in FIG. 5.

When lower than resonance frequency, the surface impedance may present inductive character, while when higher than the resonance frequency, the surface impedance may present capacitive character. When close to the resonance frequency, the surface impedance may be too large and may be equivalent to infinite impedance. When under design, if the unit structure of the cross-shaped metal strips and the through hole is made to resonate within the wireless transmitting channel frequency band, then the structure may form infinite impedance within the frequency band to prevent the current from flowing along the radiofrequency surface. In this manner, the specific absorption rage (SAR) at this frequency band is lowered.

Figure 6:
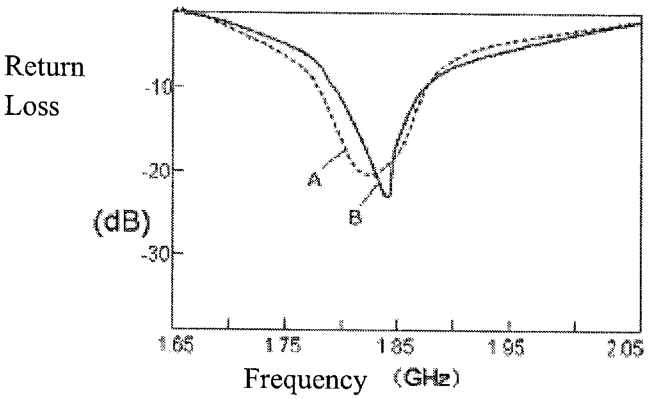
FIG. 6 is a comparison diagram of return loss test curves of an antenna with cross-shaped high-impedance surface units and an antenna without cross-shaped high-impedance surface units of a wireless communication device according to an embodiment of the present invention.

As shown in FIG. 6, the dashed line A is the curve graph of a return loss test of a planar inverted-F antenna with high-impedance surface units for grounding. The full line B is the curve graph of the return loss test of the planar inverted-F antenna without high-impedance surface units for grounding. As seen from the curve A, the additions of the cross-shaped high-impedance surface metal strips 130 and high-impedance surface through holes 160 have only a little impact on the return loss, thus the radiation capability is assured to be basically unaffected.

Figure 7:
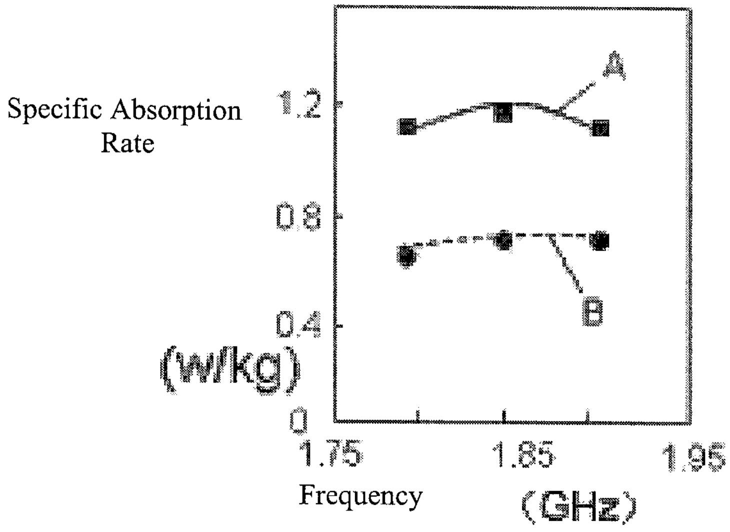
FIG. 7 is a comparison diagram of specific absorption rate (SAR) test curves of an antenna with cross-shaped high-impedance surface units and an antenna without cross-shaped high-impedance surface units of a wireless communication device according to an embodiment of the present invention.

As shown in FIG. 7, the dashed line A is the curve graph of a specific absorption rate (SAR) test of a planar inverted-F antenna with high-impedance surface units for grounding, the full line B is the curve graph of specific absorption rate (SAR) test of planar inverted-F antenna without high-impedance surface units for grounding. As seen from the dashed line A, the additions of the cross-shaped high-impedance surface metal strips 130 and high-impedance surface through holes 160 lower the specific absorption rate (SAR) effectively by about 35% compared with that at the same frequency point.

It should be understood that the description above are only the embodiments of the present invention with no intention to limit the technical solutions of the present invention. For those skilled in this field, additions and reductions, replacements, variations and improvements can be made according to the above mentioned description without departing from the spirit and scope of the invention. For example, the antenna radiating element 120 may include, but not be limited to, a planar inverted-F antenna. It also can be a multi-band antenna, while all the technical solutions with any addition or reduction, replacement, variation or improvement may be encompassed in the scope defined by claims attached to the present invention.

The invention claimed is:

1. A grounded antenna with cross-shaped high-impedance surface metal strips, comprising:

an antenna radiating element and a ground plate thereof, wherein multiple high-impedance surface units are arranged on the ground plate in intervals, wherein the high-impedance surface units are electrically isolated from the ground plate, and wherein at least one high-impedance surface unit is composed of two high-impedance surface metal strips to form a cross;

a high-impedance surface through hole is made at the intersection of the cross, wherein the high-impedance surface units are connected with each other via a metal layer that is electrically isolated from the ground plate through use of the high impedance surface through holes to define a two-dimensional electric filter used to prevent current flow along the ground plate.

2. The grounded antenna with cross-shaped high-impedance surface metal strips of claim 1, wherein the ground plate is a printed circuit board, the high-impedance surface units are arranged on a surface of the printed circuit board, and the high-impedance surface through holes are set to pass through the printed circuit board.

3. The grounded antenna with cross-shaped high-impedance surface metal strips of claim 1, wherein a length of the metal strips composing the cross-shaped high-impedance surface is about 10 mm, a distance range between two adjacent high-impedance surface metal strips is about 0.5 mm to 1.5 mm, and a length range of an overlapping section is about 2.5 mm to 3.5 mm.

4. The grounded antenna with cross-shaped high-impedance surface metal strips of claim 1, wherein the cross-shaped high-impedance surface units are arranged on the ground plate in lines.

5. The grounded antenna with cross-shaped high-impedance surface metal strips of claim 4, wherein at least one high-impedance surface metal strip is inclined relative to the lines formed by the high-impedance surface units.

6. The grounded antenna with cross-shaped high-impedance surface metal strips of claim 1, wherein: the cross-shaped high-impedance surface units are arranged on the ground plate in rows.

7. The grounded antenna with cross-shaped high-impedance surface metal strips of claim 6, wherein at least one of the high-impedance surface metal strips is inclined relative to the rows formed by the high-impedance surface units.

8. The grounded antenna with cross-shaped high-impedance surface metal strips of claim 1, wherein among the high-impedance surface units, the high-impedance surface metal strips are set in substantially parallel.

9. The grounded antenna with cross-shaped high-impedance surface metal strips of claim 1, wherein the antenna radiating element is a planar inverted-F antenna.

10. A wireless communication device, comprising:

a housing and an antenna used for communicating;

wherein the antenna is arranged in the housing comprising an antenna radiating element and a ground plate thereof;

multiple high-impedance surface units arranged on the ground plate in intervals, wherein the high-impedance surface units are electrically isolated from the ground plate, and, wherein at least one high-impedance surface unit is composed of two high-impedance surface metal strips to form a cross;

a high-impedance surface through hole made at the intersection of the cross, wherein the high-impedance surface units are connected with each other via a metal layer that is electrically isolated from the ground plate through use of the high-impedance surface through holes such that a radiation capability of the antenna, associated with a return loss of the ground plate, is unaffected by the high-impedance surface units.

11. The wireless communication device of claim 10, wherein the high-impedance surface metal strips are substantially perpendicular or substantially parallel to the high-impedance surface units.

12. The wireless communication device of claim 10, wherein a surface impedance is inductive in response to the surface impedance being lower than a resonance frequency.

13. The wireless communication device of claim 10, wherein a surface impedance is capacitive in response to the surface impedance being higher than a resonance frequency.

14. The wireless communication device of claim 10, wherein the cross-shaped high-impedance surface units are arranged on the ground plate in lines.

15. The wireless communication device of claim 14, wherein at least one of the high-impedance surface metal strips is inclined relative to the lines formed by the high-impedance surface units.

16. The wireless communication device of claim 10, wherein the cross-shaped high impedance surface units are arranged on the ground plate in rows.

17. The wireless communication device of claim 16, wherein at least one of the high-impedance surface metal strips is inclined relative to the rows formed by the high-impedance surface units.

18. The grounded antenna with cross-shaped high-impedance surface metal strips of claim 1, wherein the high-impedance surface metal strips are substantially perpendicular to the high-impedance surface units.

19. The grounded antenna with cross-shaped high-impedance surface metal strips of claim 1, wherein a surface impedance is inductive in response to the surface impedance being lower than a resonance frequency.

20. The grounded antenna with cross-shaped high-impedance surface metal strips of claim 1, wherein a surface impedance is capacitive in response to the surface impedance being higher than a resonance frequency.

* * * * *